(No Model.)

L. MILLER.
SPRING VEHICLE.

No. 458,791. Patented Sept. 1, 1891.

WITNESSES:
J. J. Laass
H. M. Seamans

INVENTOR:
Lewis Miller
BY
Duell, Laass & Duell
his ATTORNEYS

UNITED STATES PATENT OFFICE.

LEWIS MILLER, OF MEXICO, NEW YORK.

SPRING-VEHICLE.

SPECIFICATION forming part of Letters Patent No. 458,791, dated September 1, 1891.

Application filed September 18, 1890. Serial No. 365,364. (No model.)

*To all whom it may concern:*

Be it known that I, LEWIS MILLER, of Mexico, in the county of Oswego, in the State of New York, have invented new and useful Improvements in Spring-Vehicles, of which the following, taken in connection with the accompanying drawings, is a full, clear, and exact description.

This invention relates to the class of spring-vehicles in which coil-springs are employed for elastically supporting the body of the vehicle on the running-gear.

The object of my present invention is to provide a spring-vehicle of the class aforesaid which shall be simpler, cheaper in construction, more compact, and more convenient in its use, and have its body rigidly attached to the upper ends of the coil-springs, which carry the body much lower than other analogous vehicles; and to that end it consists in the improved construction and combination of parts hereinafter described, and specifically set forth in the claim.

Figure 1:
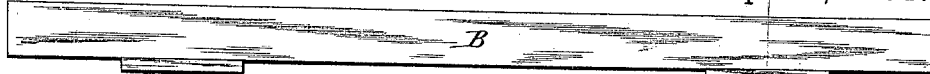
Figure 2:
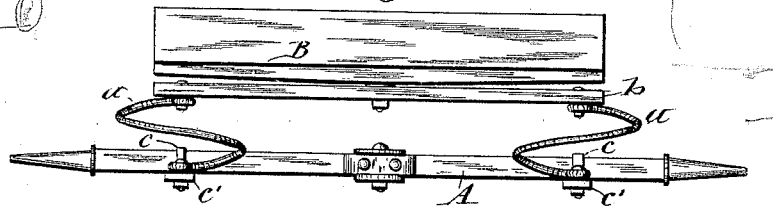
Figure 3:
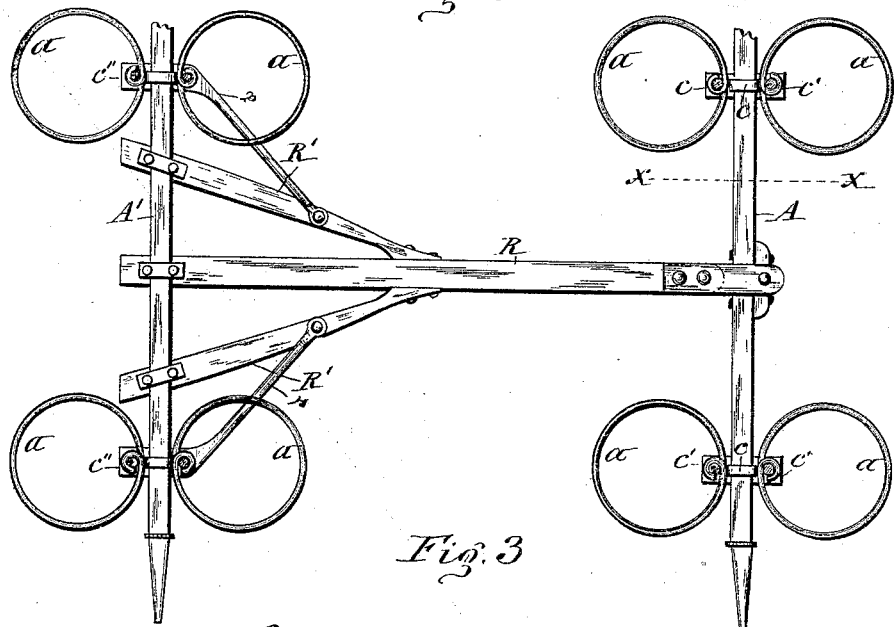
Figure 4:
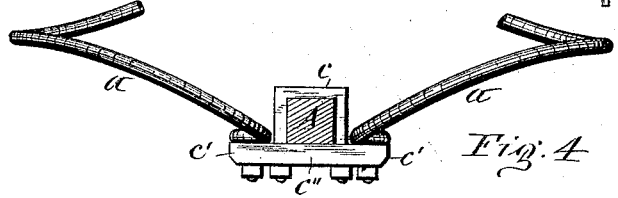
Figure 5:
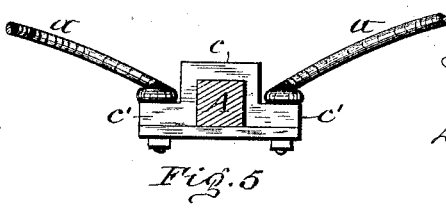

In the annexed drawings, Figure 1 is a side view of the vehicle minus its wheels and embodying my improvements. Fig. 2 is a front end view of the same. Fig. 3 is a plan view immediately under the body of the vehicle. Fig. 4 is an enlarged transverse section on line $x$ $x$, Fig. 3; and Fig. 5 is a side view of a modification of my invention.

Similar letters of reference indicate corresponding parts.

A A' represent, respectively, the front and hind axles, connected by a reach R and reach-braces R' R', which reach and its braces extend across the bottom of the hind axle and are rigidly secured thereto, preferably by means of clips, as shown. The object of placing the reach and its braces beneath the axle is to obviate as much as possible obstructions on top of the axle which may limit the vertical play of the body of the vehicle, and consequently the body can be carried much lower. This is very important, inasmuch as it facilitates the loading of the vehicle and is more convenient for a person in mounting the vehicle.

B denotes the body or box of the vehicle, which I support directly upon the upper ends of coil-springs $a$ $a$, disposed axially vertically at opposite sides of the axle and supported thereon by means of clips $c$ $c$, which are fastened to the axle and are provided below the top of the axle with projections $c'$ $c'$, on which the coil-springs are mounted. The projections $c'$ $c'$ may be formed on the clip proper, which embraces the axle in the usual manner, as represented in Fig. 5 of the drawings; but I prefer to employ, especially on the front axle, a plain clip $c$ in connection with the clip-tie $c''$, which is formed with extensions $c'$ $c'$, on which the springs are mounted and secured by bolts passing through eyes on the lower ends of the springs and through the aforesaid clip-tie extensions, as shown in Fig. 4 of the drawings. In either of the aforesaid constructions the extensions $c'$ $c'$ are to be enlarged in width sufficiently to afford proper seats for the springs. The clips are securely held against displacement or "slip" by means of braces $r$ $r$, which have one end secured to the brace R' and the other end to the clip or clip-tie plate. The reach R is pivoted to the front axle in such a manner as to carry the reach in the same plane with the axle and allow a maximum vertical play of the body over the axle, which will be readily perceived by reference to Fig. 2 of the drawings. In order to allow the said axle, with the springs connected thereto, to turn in a horizontal plane on the pivot of the axle and at different angles to the body confined in its position in relation to the hind axle, I secure to the tops of the coil-springs $a$ $a$ over the front axle a cross-bar, and pivot the body to said cross-bar at a point over the center of the length of the axle, as shown in Fig. 2 of the drawings.

It will be observed that by my invention I produce a vehicle which has the body or box rigidly attached to and supported directly on the ends of coil-springs, and this dispenses with the extra bolsters over the hind axle and carries the body much lower than other vehicles of this class. Besides this the vehicle is simpler and cheaper in construction, more compact, and more convenient in its use than other vehicles in which the coil-springs are supported on the usual bolster and carry on their tops a supplemental bolster on which the body is removably seated.

What I claim as my invention is—

In a spring-vehicle, the combination, with the rear axle and body thereof, of the coil-springs having one end secured to the clip projection and the other end attached directly to the body; the clips and their tie-plates, and the clip-braces for holding the clips rigidly in place on the axle, substantially as specified.

In testimony whereof I have hereunto signed my name this 8th day of September, 1890.

LEWIS MILLER. [L. S.]

Witnesses:
C. R. COPP,
L. A. WHITNEY.